United States Patent [19]

Matzner et al.

[11] Patent Number: 5,077,351

[45] Date of Patent: Dec. 31, 1991

[54] PROCESS FOR THE PREPARATION OF POLYCARBONATE AND/OR POLYARYLATE BLOCK COPOLYMERS WITH POLY(ARYL ETHERS)

[75] Inventors: Markus Matzner, Edison; George T. Kwiatkowski, Green Brook; Robert A. Clendinning, New Providence; Selvaraj Savariar, Somerset; Mohammad J. El-Hibri, Highland Park; Charles N. Merriam, Harvey Cedars; Robert J. Cotter, Bernardsville, all of N.J.

[73] Assignee: Amoco Corporation, Chicago, Ill.

[21] Appl. No.: 332,880

[22] Filed: Apr. 3, 1989

[51] Int. Cl.$^5$ .................... C08G 81/00; C08G 75/23; C08G 64/18; C08G 63/64
[52] U.S. Cl. .................................. 525/394; 525/397; 525/425; 525/433; 525/437; 525/439; 525/462; 525/466
[58] Field of Search ............... 525/394, 437, 439, 462, 525/466, 425, 433, 397

[56] References Cited

U.S. PATENT DOCUMENTS

| | | | |
|---|---|---|---|
| 4,645,806 | 2/1987 | Freitag | 525/462 |
| 4,657,977 | 4/1987 | Peters | 525/425 |
| 4,668,744 | 5/1987 | Matzner | 525/418 |
| 4,880,884 | 11/1989 | Mullins | 525/462 |

FOREIGN PATENT DOCUMENTS 149921 7/1985 European Pat. Off. .

OTHER PUBLICATIONS

McGrath, "BPA Polycarbonate-BPA Polysulfone Block Copolymers", *Polymer Eng. & Sci.;* Aug. 1977, vol. 17 #8.

*Primary Examiner*—John C. Bleutge
*Assistant Examiner*—David Buttner
*Attorney, Agent, or Firm*—Janice M. McLain; William H. Magidson; Ralph C. Medhurst

[57] ABSTRACT

The invention describes a novel process for the preparation of polycarbonate and/or polyarylate block copolymers with poly(aryl ethers). The process is comprised of the steps:

(a) the reaction of a dihydroxy-terminated poly(aryl ether) oligomer with a high molecular weight polycarbonate, or a high molecular weight polyarylate, or a high molecular weight poly(arylate-carbonate) to yield a block copolymer; followed by (b) the coupling of the material obtained in step (a) to the required molecular weight, using a diaryl ester of carbonic acid or of a dicarboxylic acid.

Both steps are performed in the presence of a catalyst. The copolymerizations can be run in bulk under vacuum in a single or twin screw extruder. Using the above conditions high molecular weight, high quality block copolymers having a combination of excellent properties are obtained in a matter of minutes.

6 Claims, No Drawings

PROCESS FOR THE PREPARATION OF POLYCARBONATE AND/OR POLYARYLATE BLOCK COPOLYMERS WITH POLY(ARYL ETHERS)

FIELD OF THE INVENTION

This invention is directed to a novel process for the preparation of polycarbonate and/or polyarylate block copolymers with poly(aryl ethers). The process is comprised of the following steps:

(a) the reaction of a dihydroxy-terminated poly(aryl ether) oligomer with a high molecular weight polycarbonate, or a high-molecular weight polyarylate, or a high molecular weight poly(arylate-carbonate) to yield a block copolymer; followed by (b) the coupling of the material obtained in step (a) to the required molecular weight, using a diaryl ester of carbonic acid or of a dicarboxylic acid. Both steps are performed in the presence of a catalyst. Steps (a) and (b) may be performed separately or in a one-pot operation. The reactions may be run neat or in an inert, preferably high boiling, organic solvent.

The remarkable and totally unexpected feature of the instant invention is the fact that high molecular weight, high quality block copolymers, displaying an excellent combination of properties, excellent color and transparency, can be prepared in a matter of minutes. It is preferred to conduct the synthesis in bulk, under vacuum; using mixing equipment which will maximize surface exposure, e.g. single or twin screw extruders.

The subject polycarbonate and/or polyarylate block copolymers with poly(aryl ethers) are useful thermoplastics per se, as well as in blends with other polymers and in composites.

BACKGROUND OF THE INVENTION

Aromatic polycarbonates are polyesters of dihydric phenols and carbonic acid; they are tough engineering thermoplastics and have been known for more than three decades. A representative material of this class of polymers is the polycarbonate of 2,2-bis(4-hydroxyphenyl)propane(Bisphenol-A) of formula (1). Polymer (1) has a glass transition temperature (Tg) of about 150° C.; it is

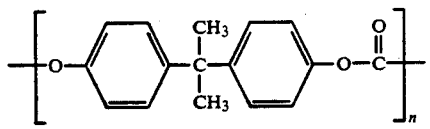

offered commercially by a number of companies. polycarbonates are widely described in the literature-see, for example, Schnell, Angewandte Chemie, 1956, 68,633; and Fox, Encyclopedia of Chemical Technology, 3rd. Edition, 1982, Vol. 18, pp. 479-494, John Wiley and Sons, New York, N.Y.

Polyarylates are aromatic polyesters derived from dihydric phenols and aromatic dicarboxylic acids. The material based on 2,2-bis(4-hydroxyphenyl)propane and a 50:50 mixture of terephthalic and isophthalic acids (2) is offered commercially by Amoco Performance Products, Inc., under the tradename Ardel D-100 ®. Polyarylates are high temperature, high performance thermoplastic polymers

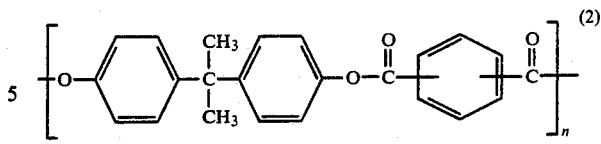

with a good combination of thermal and mechanical properties. They display excellent UV resistance and have good processibility which allows them to be molded into a variety of articles.

A group of related polymers which combine the characteristics of aromatic polycarbonates and polyarylates-the poly(arylate-carbonates)-are also known. The preparation of these latter materials is described in, for example, U.S. Pat. Nos. 3,030,331 and 3,169,121.

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of polymer Science, A-1, Vol. 5, 1967, pp. 2415-2427, Johnson et al., U.S. Pat. Nos. 4,108,837 and 4,175,175. Johnson et al., show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

PAE's presenting the greatest practical interest are those that contain the sulfone group. Thus, poly(aryl ether sulfones) (3) and (4)

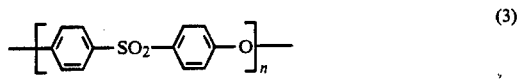

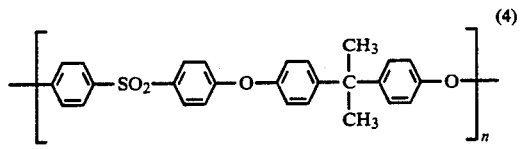

are commercially available, tough, thermoplastic materials. They possess a number of attractive features such as excellent high temperature resistance, good electrical properties, and very good hydrolytic stability. Polymer (3) is available from Imperial Chemical Industries, Ltd. under the trademark of Victrexe ® Poly(ether sulfone). The resin contains no aliphatic moeities and has a heat deflection temperature of approximately 210° C. Material (4) is available from Amoco Performance Products, Inc., under the trademark of has a heat deflection temperature of about 180° C.

In recent years, there has developed a growing interest in crystalline poly(aryl ethers) such as poly(aryl ether ketones) (PAEK's); this is evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, Vol. 22, August, pp. 1096-1103; Blundell et al., Polymer, 1983, Vol.

24, August, pp. 953-958; Atwood et al., polymer preprints, 20, No. 1, April 1979, pp. 191-194; and Rueda et al., Polymer Communications, 1983, Vol. 24, September, pp. 258-260. In the early to mid-1970's, Raychem Corporation commercially introduced a PAEK called STILAN, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values (>50 ft-lb/in$^2$) in the tensile impact test (ASTM D-1822). They have potential for a wide variety of uses; their favorable properties class them in the upper bracket of engineering polymers.

Efforts to combine the advantageous properties of an aromatic polycarbonate and/or of a polyarylate with those of an aromatic poly(aryl ether) were made over the years. Unique materials such as, for example, one having the UV resistance of a polyarylate and the hydrolytic stability of a poly(aryl ether) can be envisioned. Hence, a variety of alloys of the subject polymers were prepared. Blends of poly(aryl ethers) and polycarbonates are known from U.S. Pat. No. 3,365,517. The patent states that as a result of this blend, polycarbonate polymers are rendered more resistant to environmental stress crazing and cracking, and their heat distortion temperatures are increased; and that thermoplastic poly(aryl ethers) are rendered more resistant to thermal stress embrittlement. Shaped articles formed from a blend of a poly(aryl ether) resin and an aromatic polycarbonate and/or a polyarylate resin are described in U.S. Pat. No. 4,746,710. Improved hydrolytic stability for the obtained articles is claimed in the above patent. Thus, as can be seen, alloying of the subject resins does lead to materials with improved characteristics. The main drawback of the alloys in question is the fact, that due to the lack of polymer-polymer solubility, they are opaque; and cannot be used in applications where transparency is required.

To circumvent the transparency problem, block copolymers of aromatic polycarbonates and of polyarylates with aromatic poly(aryl ethers) were prepared. As expected, the copolymers displayed an overall combination of good properties and yielded transparent articles upon molding. The copolymers were studied extensively both in the United States and abroad. For block copolymers of aromatic polycarbonates with aromatic poly(aryl ethers)-see, for example, McGrath et al., Polymer Engineering and Science, 1977, 17, pp. 647-651; McGrath et al., J. Polym. Sci., Polymer Sympos., 1977, 60, pp. 29-46; McGrath et al., Polymer Preprints, American Chemical Society, 1978, 19 (1), pp. 109-114; and Ward et al., Polymer preprints, American Chemical Society, 1978, 19 (1), pp. 115-120. Block copolymers incorporating polyarylates and aromatic poly(aryl ethers) are described in, for example, Storozhuk et al., Vysokomol. Soed., 1979, A, 21, pp. 152-160; Banthia et al., Org. Coat. Plast. Chem. 1980, 42, pp. 127-133; Dubrovina et al., Vysokomol. Soed., 1981. B, 23, pp. 384-388; Shelgaev et al., Vysokomol. Soed., 1982, A, 24, pp. 2315-2320; Webster et al., Contemp. Topics Polym. Sci., 1984, 4, pp. 959-975; Mikitaev et al., Vysokomol. Soed., 1984, A, 26, pp. 75-78; USSR Patent No. 1,121,277; German Patent Application No. 2,648,470; and Japanese Patent Application No. 62/215,626. Aromatic polyester extended poly(aryl ether ketones) are found in Kricheldorf, polymer, 1984, 25, pp. 1151-1156.

In addition, block copolymers were also prepared from poly(phenylene oxides) and aromatic polycarbonates (U.S. Pat. Nos. 4,436,876 and 4,463,132; World Patent Application No. 82/04,056) and polyarylates (European Patent Application No. 149,921); as well as from liquid crystalline polyesters and various poly(aryl ethers); see, for example, Matzner et al., U.S. Pat. No. 4,619,975; Matzner et al., U.S. Pat. No. 4,668,744; Lambert et al., Polymer Preprints, American Chemical Society, 1985, 26 (2), pp. 275-277; and Lambert, Ph.D. Dissertation, Virginia Polytechnic Institute and State University, February 1986.

All of the references pertaining to the preparation of block copolymers from polycarbonates or polyarylates with poly(aryl ethers) disclose exclusively routes utilizing phosgene or acid chlorides, the reactions being performed either in solution or in a two-phase interfacial system. A typical preparation of a block copolymer (see, for example, McGrath et al., J. Polym. Sci., Polymer Sympos., 1977, 60, p. 39) is shown in equation (I).

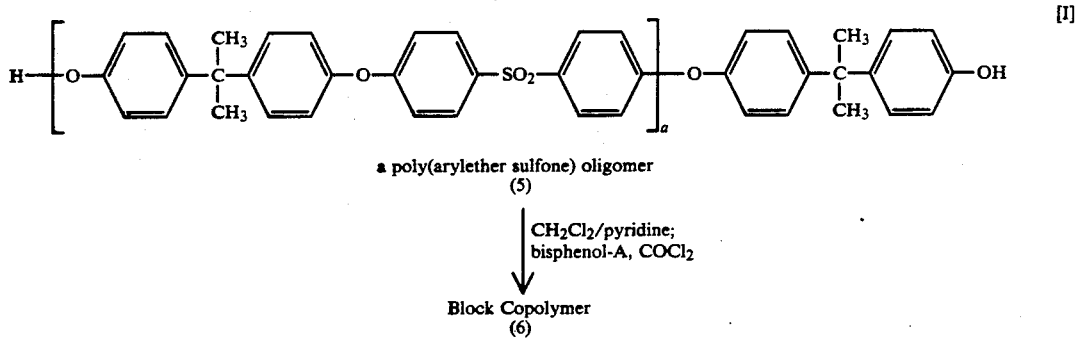

a poly(arylether sulfone) oligomer
(5)

| CH$_2$Cl$_2$/pyridine;
| bisphenol-A, COCl$_2$

Block Copolymer
(6)

The subject synthetic routes require expensive and/or toxic (e.g. phosgene) acid chlorides: large amounts of solvents must be handled and recycled; by-products (e.g. sodium chloride, aqueous effluents, etc.) must be safely disposed. Overall, the acid chloride processes are cumbersome, uneconomical and environmentally unattractive.

Melt processes were used in the preparation of block copolymers based on poly(aryl ethers) and liquid crystalline polyesters. The polymerization reactions were slow, however, and required several hours to attain high molecular weights. These processes involved the copolymerization of poly(aryl ethers) with the monomeric constituents of the liquid crystalline polyesters, e.g., p-hydroxybenzoic acid, terephthalic acid, biphenol, etc.

In summary, materials with good properties could be obtained via block copolymerization. However, their usefulness was severely limited because of the lack of an adequate, commercially acceptable process for their preparation.

THE INVENTION

This invention is directed to a novel process for the preparation of block copolymers of aromatic polycarbonates and/or polyarylates with poly(aryl ethers). The process does not require expensive and/or toxic starting materials and is environmentally attractive; the copolymerization can be carried out in commercial equipment and excellent quality material can be made within a matter of minutes.

Briefly, the process involves the following steps:

(a) the reaction of a dihydroxy-terminated poly(aryl ether) oligomer with a high molecular weight aromatic polycarbonate, or a high molecular weight polyarylate, or a high molecular weight poly(arylate-carbonate); this reaction yields a dihydroxy-terminated low molecular weight block copolymer (8); and (b) the advancement of (s) to a high molecular weight block copolymer (9) via reaction with a diaryl ester of carbonic acid or of a dicarboxylic acid. The reaction sequence is represented in equation (II):

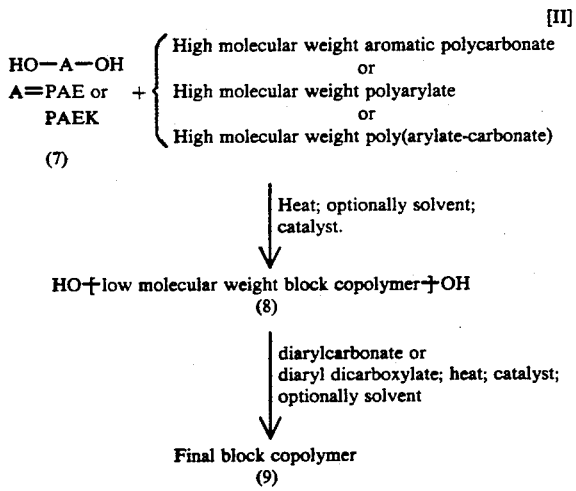

The two steps [(a) and (b)] may be performed separately or as a one-pot operation.

Another distinguishing feature of this block copolymer forming process is that it does not require the use of polycarbonates, polyarylates or poly(arylate-carbonates) with reactive terminal groups. The process has been successful while employing, for example, commercial polycarbonates.

The process of the instant invention yields block copolymers of the general formulae (10) and/or (10a) and/or (10b).

$(AB)_m$ and/or ABA and/or BAB
(10)         (10a)        (10b)

In the formulae (10), (10a) and (10b), A is the PAE or the PAEK block, and B is the aromatic polycarbonate, the polyarylate or the poly(arylate-carbonate) block; the molecular weights of the blocks A and B, individually, are at least 500, preferably at least 1,000 and most preferably at least 1,500; m is an integer and is one or greater. The weight ratio of the blocks A:B is in the range of from about 1:99 to about 99:1.

It is, of course, possible to bypass step (a) and to advance the oligomer (7)

HO—A—OH         (7)

to high molecular weight by the direct reaction with a diaryl carbonate or a diaryl dicarboxylate. The obtained carbonate or ester extended poly(aryl ethers) are described in U.S. Pat. No. 4,275,186.

The preparation of the block copolymers, as outlined in equation (II), may also be performed using (7a) instead of (7).

RO—A—OR         (7a)

In (7a) A is as previously defined; R is an aryloxycarbonyl group, where aryl is, for example, phenyl or tolyl. It is, of course, obvious to those skilled in the art that in this latter case, no addition of diaryl carbonate or of a diaryl dicarboxylate is required in step (b).

The Aromatic Polycarbonates

The thermoplastic aromatic polycarbonate resins that can be employed herein are homopolymers and copolymers and mixtures thereof, which have an intrinsic viscosity of from about 0.4 to about 1.0 dl/g as measured in methylene chloride or in chloroform at 25° C. The polycarbonates are prepared by reacting a dihydric phenol with a carbonate precursor. Typical of some of the dihydric phenols that may be employed are bisphenol-A, bis(4-hydroxyphenyl) methane, 2,2-bis(4-hydroxy-3-methylphenyl)-propane, 4,4-bis(4-hydroxyphenyl)heptane, 2,2-bis(3,5-dibromo-4-hydroxyphenyl)-propane, (3,3'-dichloro-4,4'-dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(chloronaphthyl)carbonate, etc. or mixtures thereof. The haloformates suitable for use herein include bishaloformates of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, or a bicarbonate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used. These methods are described in, for example, U S. Pat. Nos. 3,153,008 and 3,028,365. The preferred polycarbonate is bisphenol-A polycarbonate.

The Polyarylates

The polyarylate resins which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5g/100ml chloroform) or other suitable solvent at 25° C.

A particularly desirable dihydric phenol is of the following formula:

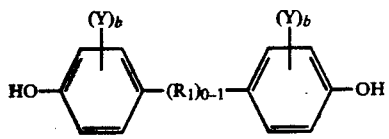

where Y is independently selected from, hydrogen, alkyl groups of 1 to 4 carbon atoms, chlorine or bromine, each b, independently, has a value of from 0 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:
2,2-bis(4-hydroxyphenyl)propane(Bisphenol-A),
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,2-bis[3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxyphenyl)pentane,
3,3-bis(4-hydroxyphenyl)pentane,
2,2-bis(4-hydroxyphenyl)heptane,
1,2-bis(4-hydroxyphenyl)1,2-bis-(phenyl)propane,
4,4'-dihydroxydiphenyl ether,
4,4'-dihydroxydiphenyl sulfide,
4,4'-dihydroxydiphenyl sulfone,
4,4'-dihydroxydiphenyl sulfoxide,
4,4'-dihyqroxybenzophenone,
naphthalene diols, hydroquinone and resorcinol.
Bisphenol-A is the preferred dihydric phenol.

The aromatic dicarboxylic acids that may be used in this invention include terephthalic acid, isophthalic acid, and any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic acids and terephthalic acids are used. The isophthalic acid to terephthalic acid ratio in the mixtures is from about 0:100 to about 100:0, while the most preferred acid ratio is in the range of about 85:15 to about 15:85. Also, from about 0.5 to about percent of aliphatic diacids containing from 2 to about 10 carbon atoms, such as adipic acid, sebacic acid, and the like may be additionally used in the polymerization reaction.

The polyarylates can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that its concentration is less than about 1500 parts per million.

Suitable acid anhydrides are derived from acids containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

Poly(arylate-carbonates)

These materials are described in, for example, U.S. Pat. No. 3,169,121, herein incorporated by reference. Such copolyesters comprise recurring carbonate groups

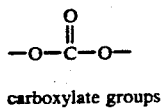

carboxylate groups

and aromatic groups in the linear polymer chain, in which at least some of the carboxylate groups and at least some of the carbonate groups are bonded directly to ring carbon atoms of the aromatic groups. The copolyesters are prepared by reacting, as essential ingredients, a difunctional carboxylic acid, a difunctional phenol, and a carbonate precursor, methods for preparing the copolyesters being well known, and disclosed in U.S. Pat. Nos. 3,030,331 and 3,169,121, among others. These copolyesters comprise at least two of the following four recurring units in their linear chain.

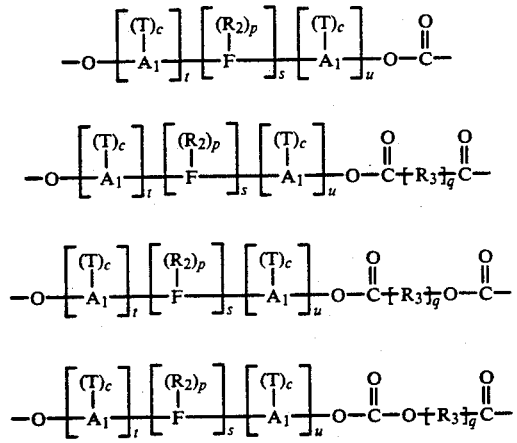

wherein $A_1$ and $R_3$ are independently aromatic groups such as phenylene, biphenylene, naphthylene, anthracenylene, and the like;

F may be an alkylene, cycloalkylene, alkylidene or cycloalkylidene group such as methylene, ethylene, propylene, propylidene, isopropylidene, butylene, butylidene, amylene, isoamylene, amylidene, isoamylidene, cyclohexylene, cyclohexylidene, and the like;

$R_2$ is hydrogen, alkyl, cycloalkyl, aryl, and the like;

T is an inorganic atom such as chlorine, bromine, or fluorine, an inorganic group such as nitro, an organic group such as $R_2$ above, or any alkoxy group such as $OR_2$, it being only necessary that T be inert to and unaffected by the reactants and reaction conditions;

c is any whole number from and including zero through the number of positions available on A for substitution;

p is any whole number from and including zero through the number of available positions on F;

q is a whole number equal to at least one.

s is either zero or one;

t is a whole number equal to at least one; and u is any whole number including zero.

Examples of dihydric phenols useful in making polyester-carbonates include all of those mentioned in connection with making polyarylates, supra.

The carboxylic acids useful in making polyester-carbonates include:

saturated, aliphatic dibasic acids derived from straight chain paraffin hydrocarbons such as oxalic, malonic, dimethyl malonic, succinic, glutaric, adipic, pimelic, suberic, azelaic, and sebacic acid, and halogen-substituted derivatives thereof;

aliphatic carboxylic acids containing hetero atoms in their aliphatic chain, such as thio-diglycolic or diglycolic acid;

unsaturated acids such as maleic or fumaric;

aromatic and aliphatic-aromatic dicarboxylic acids such as phthalic, isophthalic, terephthalic, homophthalic, o-, m-, and p-phenylene diacetic acid, and polynuclear aromatic diacids (e.g. naphthalene dicarboxylic).

hydroxy acids including aliphatic hydroxy acids such as hydroxybutyric, glycolic, and lactic acid, aliphatic-aromatic hydroxy acids such as mandelic and o, m, and p-hydroxybenzoic acid; and long chain fatty acids such as 12-hydroxystearic acid;

cycloaliphatic acids including tetrahydrophthalic, tetrahydroterephthalic, tetrahydroisophthalic, and the like.

A preferred polyester carbonate results from the condensation of phosgene, terephthaloyl chloride, isophthaloyl chloride with bisphenol-A and a small amount of p-tert-butylphenol as the chain terminator. The reduced viscosities of the poly(arylate-carbonates) are generally in the range that was found to be useful for polyarylates.

Poly(aryl ethers), PAE's

The aryl ether blocks of the instant invention are of the formula

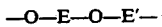

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Aromatic polyethers containing such units are described in, for example, U.S. Pat. Nos. 3,264,536 and 4,175,175. It is preferred that the dihydric phenol be a weakly acidic dinuclear phenol such as, for example, the dihydroxy diphenyl alkanes or the nuclear halogenated derivatives thereof, such as for example, the 2,2-bis(4-hydroxyphenyl)propane, 1,1-bis(4-hydroxyphenyl-2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen (—O—), sulfone

or hydrocarbon residue in
which the two phenolic nuclei are joined to the same or different carbon atoms of the residue.

Such dinuclear phenols can be characterized as having the structure:

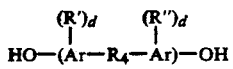

wherein Ar is an aromatic group and preferably is a phenylene group, R' and R") can be the same or different inert substituent groups such as alkyl groups having from 1 to 4 carbon atoms, aryl, halogen atoms, i.e., fluorine, chlorine, bromine or iodine, or alkoxyl radicals having from 1 to 4 carbon atoms, the d's are independently integers having a value of from 0 to 4, inclusive, and $R_4$ is representative of a bond between aromatic carbon atoms as in dihydroxyl-diphenyl, or is a divalent radical, including for example, radicals such as —O—, —S—, —S—S—, —SO—, —SO$_2$, and divalent hydrocarbon radicals such as alkylene, alkylidene, cycloalkylene, cycloalkylidene, or the halogen, alkyl, aryl, or like substituted alkylene, alkylidene or cycloaliphatic radicals as well as aromatic radicals and radicals fused to both Ar groups.

Examples of specific dihydric polynuclear phenols include among others:
the bis(hydroxyaryl) alkanes such as
2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)propane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane
2,2-bis(2-isopropyl-4-hydroxyphenyl)propane
2,2-bis(4-hydroxynaphthyl)propane
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
2,2-bis(4-hydroxyphenyl)-1-phenyl-propane,
2,2-bis(4-hydroxyphenyl)1,1,1,3,3,3,-hexafluoropropane and the like;
di(hydroxyaryl) sulfones such as
bis(4-hydroxyphenyl)sulfone,
2,4'dihydroxydiphenyl sulfone,
5-chloro-2,4'-dihydroxydiphenyl sulfone,
5-chloro-4,4'-dihydroxydiphenyl sulfone, and the like;
di(hydroxyaryl)ethers such as bis(4-hydroxyphenyl)ether,
the 4,3'-, 4,2'-, 2,2'-, 2,3'-dihydroxydiphenyl ethers,
4,4'dihydroxy-2,6-dimethyldiphenyl ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether, and
4,4'-dihydroxy-3,6-dimethoxydiphenyl ether.

Other useful diphenols are, for example, the naphthalene diols, and the mononuclear diphenols such as hydroquinone or resorcinol. Dihydroxydiphenyls such as 4,4'-biphenol are also very useful.

As herein used, the E term is defined as being the "residuum of the dihydric phenol" of course refers to the residue of the dihydric phenol after the removal of the two aromatic hydroxyl groups. Thus, as is readily seen, these aryl ether units contain groups of the residuum of dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about one percent and preferably below 0.5 percent for best results.

An electron withdrawing group is employed as the activator group in these compounds. It should be, of course, inert under the reaction conditions, but otherwise its structure is not critical. Preferred are the strongly activating groups such as the sulfone group

bonding two halogen or nitro substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:

(a) monovalent groups that activate one or more halogens or nitro groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group $$-\overset{\overset{O}{\|}}{\underset{\overset{\|}{O}}{S}}-;$$

the vinylene group $$-\overset{H}{\underset{H}{C}}=\overset{}{\underset{}{C}}-;$$

the sulfoxide group $$-\overset{\overset{O}{\|}}{S}-;$$

the azo group $$-N=N-;$$

the saturated fluorocarbon groups $$-\overset{\overset{CF_3}{|}}{\underset{\underset{CF_3}{|}}{C}}-, \quad -CF_2CF_2CF_2-;$$

organic phosphine oxides $$-\overset{\overset{O}{\|}}{\underset{\underset{R'''}{|}}{P}}-$$

where R''' is a hydrocarbon group; and the ethylidene group $$\overset{H-C-H}{\underset{-C-}{\|}}$$

The activated dihalo- and/or dinitrobenzenoid compounds may also be one or more of the following:

[structure with two benzene rings connected through imide groups and $Ar_4$ bridge, with $T_1$ substituents]

[structure with naphthalene and benzene rings connected through imide groups and $Ar_4$ bridge, with $T_1$ substituents]

or isomers thereof

[structure with two naphthalene rings connected through imide groups and $Ar_4$ bridge, with $T_1$ substituents]

or isomers thereof

[structure with two naphthalene rings (peri-fused imides) connected through $Ar_4$ bridge, with $T_1$ substituents]

or isomers thereof wherein $T_1$ is a halo and/or a nitro group and is in position ortho or para to the imide carbonyl group; and $Ar_4$ is a divalent aromatic radical.

If desired, the polymers may be made with mixtures of two or more dihalobenzenoid or dinitrobenzenoid compounds. Thus, the E' residuum of the benzenoid compounds in the polymer structure may be the same of different.

It is seen also that as used herein, the E' term defined as being the "residuum of the benzenoid compound" refers to the aromatic or benzenoid residue of the compound after the removal of the halogen atom or nitro group on the benzenoid nucleus.

Preferred aryl ether units of this invention are those prepared using the dihydric polynuclear phenols of the formulae (11)–(15) including the derivatives thereof which are substituted with inert substituent groups;

$$HO-\phenyl-\overset{\overset{R_5}{|}}{\underset{\underset{R_6}{|}}{C}}-\phenyl-OH \quad (11)$$

in which the $R_5$ groups represent independently hydrogen, lower alkyl, aryl and the halogen substituted derivatives thereof, which can be the same or different;

$$HO-\phenyl-\overset{\overset{O}{\|}}{\underset{\underset{O}{\|}}{S}}-\phenyl-OH \quad (12)$$

$$HO-\phenyl-O-\phenyl-OH \quad (13)$$

$$HO-\phenyl-OH \quad (14) \qquad HO-\phenyl-\phenyl-OH \quad (15)$$

and substituted derivatives thereof.

It is also contemplated in this invention to use a mixture of two or more different dihydric phenols to accomplish the same ends as above. Thus, when referred to above, the —E— residuum in the polymer structure can actually be the same or different aromatic residua.

The preferred dihalobenzenoid compounds are (16), (17), (18), and (19); they may carry inert substituent groups.

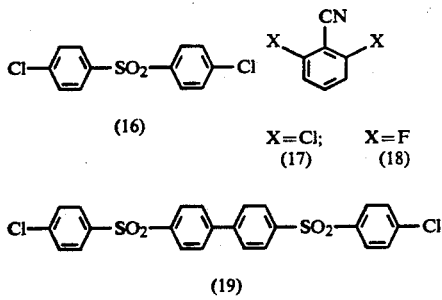

The preferred aryl ether blocks are those containing sulfone groups. Most preferred blocks are those containing one or more units of the formulae (3a), (4a), (20), and (21).

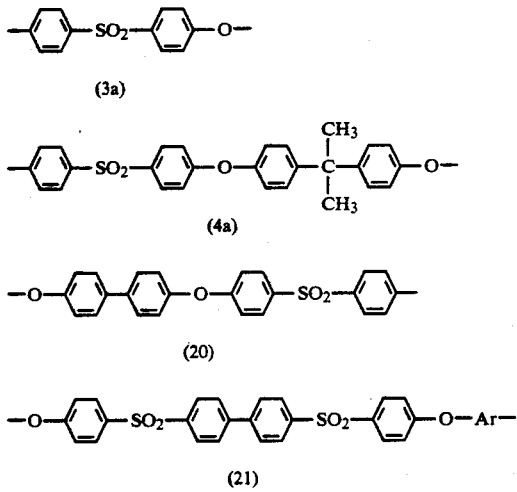

wherein $Ar_5$ is one or more of

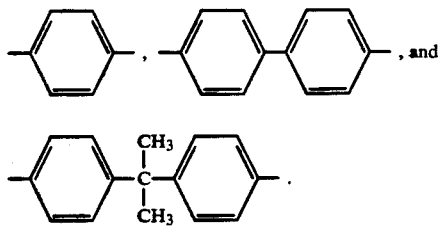

The poly(aryl ethers) may be prepared by either of two methods, i.e., the carbonate method or the alkali metal hydroxide method.

In the carbonate method, the polymers are prepared by contacting substantially equimolar amounts of the hydroxy-containing compounds and the dihalo- or dinitrobenzenoid compound, e.g., 4,4'-dichlorodiphenyl sulfone or 4,4'-difluorodiphenyl sulfone, with from about 0.5 to about 1.0 mole of an alkali metal carbonate per mole of hydroxyl group in a solvent mixture comprising a solvent which forms an azeotrope with water in order to maintain the reaction medium at substantially anhydrous conditions during the polymerization.

The temperature of the reaction mixture is kept at about 170° C. to about 250° C., preferably from about 210° C. to about 235° C. for about one to about 15 hours. However, lower or higher temperatures may also be adequate.

In a modification which is particularly suitable for making copolymers from bisphenol A and one or more additional dihydroxy compounds, the reactants other than said additional dihydroxy compounds are charged and heated at from about 120° C. to about 180° C. for about one to about 5 hours, said additional dihydroxy compounds are added, the temperature is raised and the mixture is heated at from about 200° C. to about 250° C., preferably from about 210° C. to about 240° C., for about one to 10 hours. This modification is further described in the copending U.S. patent application of Donald R. Kelsey, et al Ser. No. 068,973, filed July 1, 1987, U.S. Pat. No. 4,783,520 commonly assigned.

The reaction is carried out in an inert atmosphere, e.g., nitrogen, at atmospheric pressure, although higher or lower pressures may also be used.

The polyarylether is then recovered by conventional techniques such as coagulation, solvent evaporation, and the like.

The solvent mixture comprises a solvent which forms an azeotrope with water and a polar aprotic solvent. The solvent which forms an azeotrope with water includes an o aromatic hydrocarbon such as benzene, toluene, xylene, ethylbenzene, chlorobenzene, and the like.

The polar aprotic solvents employed in this invention are those generally known in the art for the manufacture of polyarylether sulfones and include sulfur containing solvents such as those of the formula:

$$R_6—S(O)_\delta—R_6$$

in which each $R_6$ represents a monovalent lower hydrocarbon group free of aliphatic unsaturation, which preferably contains less than about 8 carbon atoms or when connected together represents a divalent alkylene group with $\delta$ being an integer from 1 to 2 inclusive. Thus, in all of these solvents, all oxygens and two carbon atoms are bonded to the sulfur atom. Contemplated for use in this invention are such solvents as those having the formula:

$$R_7-\overset{\overset{O}{\|}}{S}-R_7 \text{ and } R_7-\overset{\overset{O}{\|}}{\underset{\underset{O}{\|}}{S}}-R_7$$

where the $R_7$ groups are independently lower alkyl, such as methyl, ethyl, propyl, butyl, and like groups, and aryl groups such as phenyl and alkylphenyl groups such as the tolyl group, as well as those where the $R_7$ groups are interconnected as in a divalent alkylene bridge such as $$CH_2\underset{S(O)_\delta}{\overset{C_2H_4}{\diagup\diagdown}}CH_2$$

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethylacetamide, dimethylformamide and N-methylpyrrolidone.

The azeotrope forming solvent and polar aprotic solvent are used in a weight ratio of from about 1:10 to about 1:1, preferably from about 1:5 to about 1:3.

In the reaction, the hydroxy containing compound is slowly converted, in situ, to the alkali salt thereof by reacting with the alkali metal carbonate. The alkali metal carbonate is preferably potassium carbonate. As indicated before, mixtures of carbonates such as potassium and sodium carbonate may also be used.

Water is continuously removed from the reaction mass as an azeotrope with the azeotrope forming solvent so that substantially anhydrous conditions are maintained during the polymerization.

It is essential that the reaction medium be maintained substantially anhydrous during the polycondensation. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anhydrous, and preferably contain less that 0.5 percent by weight water during the reaction.

While the carbonate method for preparing the polymer of this invention is simple and convenient, in some cases products of higher molecular weight can be made by the alkali metal hydroxide method. In the alkali metal hydroxide method, described by Johnson et al., U.S. Pat. Nos. 4,108,837 and 4,175,175, a double alkali metal salt of a dihydric phenol is contacted with a dihalobenzenoid compound in the presence of a sulfur containing solvent as herein above defined under substantially anhydrous conditions.

Additionally, the poly(aryl ethers) may be prepared by other methods known in the prior art, in which at least one dihydric phenol and at least one dihalobenzenoid compound are heated, for example, with a mixture of sodium carbonate or bicarbonate and a second alkali metal carbonate or bicarbonate having a higher atomic number than that of sodium, as described in U.S. Pat. No. 4,176,222. Bulk processes are also known.

The Poly(aryl ether ketones)

The crystalline poly(aryl ether ketone)s which are suitable for use herein can be generically characterized as containing a repeating unit of one or more of the following formulae:

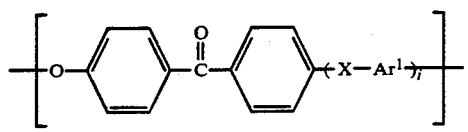
[V]

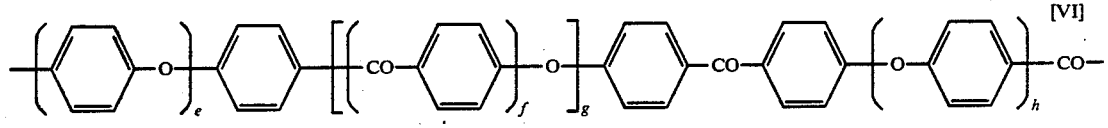
[VI]

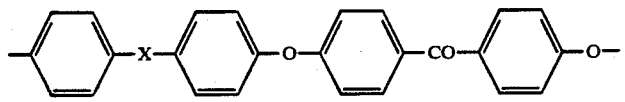
[VII]

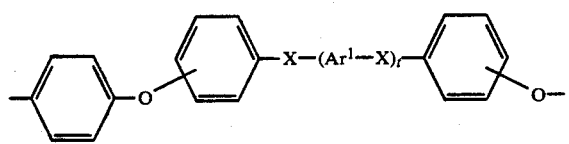
[VIII]

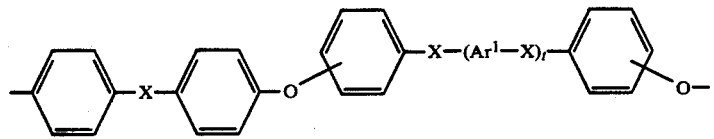
[IX]

wherein $Ar^1$ is independently a divalent aromatic radical selected from phenylene, biphenylene or naphthylene, X is independently O,

or a direct bond and i is an integer of from 0 to 3; f, g, h and t are 0 or 1 and e is an integer of 1 to 4 and preferably h is 0 when f is 1.

Preferred poly(aryl ketone)s include those having a repeating unit of the formula:

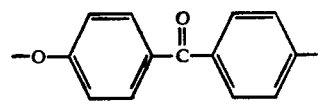
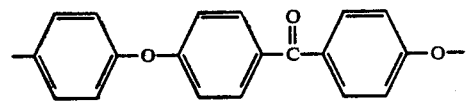
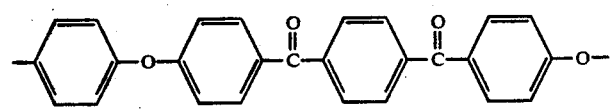
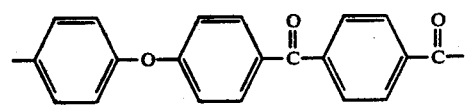
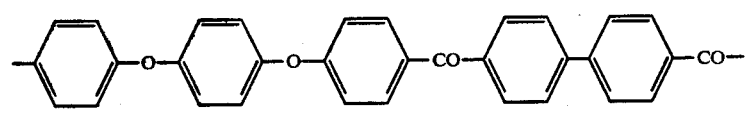
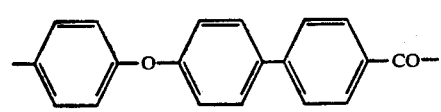
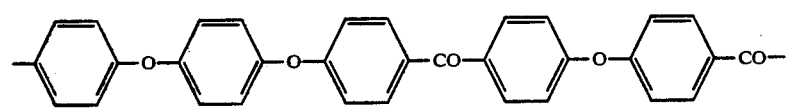
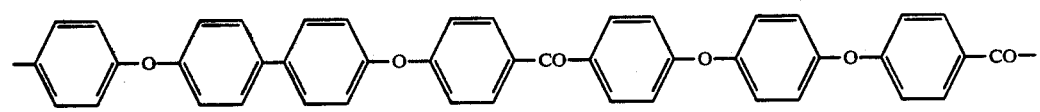
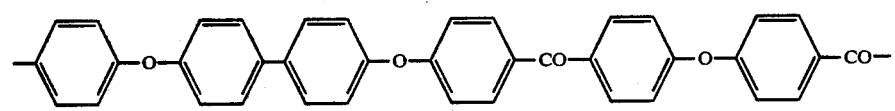
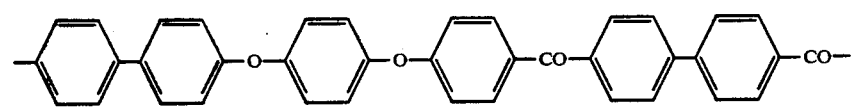
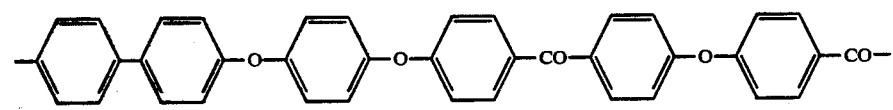
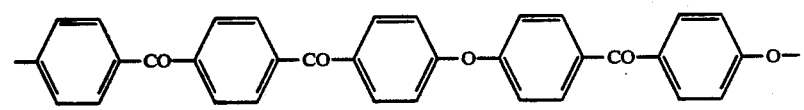
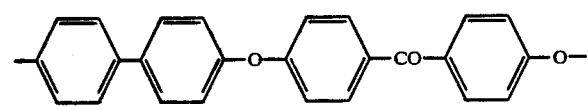
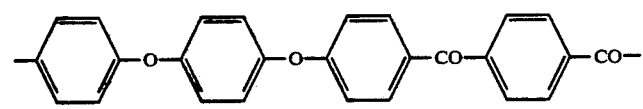

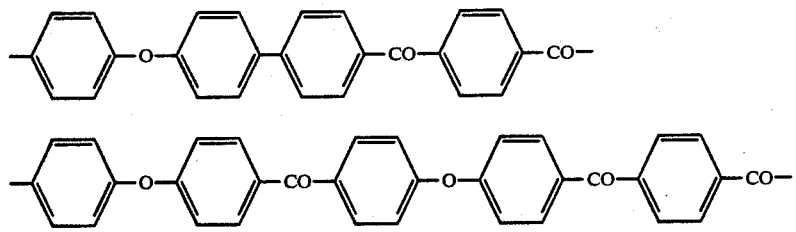

These poly(aryl ketone)s are prepared by methods well known in the art. One such method comprises heating a substantially equimolar mixture of at least one bisphenol and at least one dihalobenzenoid compound or at least one halophenol compound as described in Canadian Patent No. 847,963. Preferred bisphenols in such a process include:
hydroquinone,
4,4'-dihydroxybenzophenone,
4,4'-dihydroxybiphenyl, and
4,4'-dihydroxydiphenyl ether.

Preferred halo and dihalobenzenoid compounds include:
4-(4-chlorobenzoyl)phenol,
4,4'-difluorobenzophenone,
4,4'-dichlorobenzophenone,
4-chloro-4'-fluorobenzophenone,

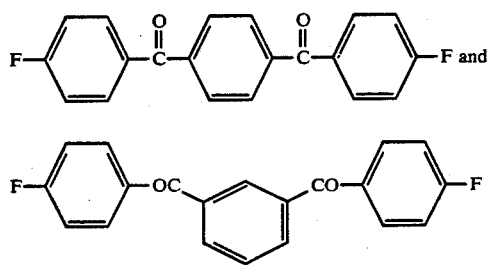

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.5 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Other base systems may be used to prepare the poly(aryl ether ketones). Thus, the above polycondensations can also be performed in the presence of (a). a combination of sodium carbonate and/or bicarbonate and an alkali metal halide selected from potassium, rubidium or cesium fluoride or chloride, or combinations thereof (see U.S. Pat. No. 4,638,044); (b). a combination of (1) lithium and/or an alkaline earth metal carbonate; and (2) sodium, potassium or cesium carbonate (see German patent Application No. 3,342,433); (c). a combination of sodium or an alkaline earth metal carbonate or bicarbonate and a potassium, rubidium or cesium salt of an organic acid (see U.S. Pat. No. 4,748,227); and (d). a combination of sodium or an alkaline earth metal carbonate or bicarbonate and a lithium, sodium or an alkaline earth metal salt of an organic acid, optionally in combination with a catalytic amount of a potassium, cesium or rubidium salt catalyst, as described in U.S. patent Application, Ser. No. 037,839; filed in the names of P. A. Winslow, D. R. Kelsey end M. Matzner on Apr. 13, 1987, entitled "Improved Process for Preparing Poly(aryl ethers) and Poly(aryl ether ketones)", commonly assigned.

Also, poly(aryl ketone)s such as those containing repeating units of the formula:

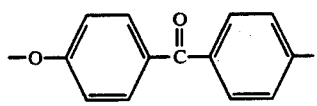

may be produced by Friedel-Craft reactions utilizing hydrogen fluoride-boron trifluoride catalysts as described, for example, in U.S. Pat. No. 3,953,400.

Additionally, poly(aryl ketones) of the following formula:

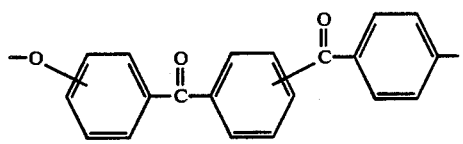

may be prepared by Friedel-Craft reactions using a boron fluoride-hydrogen fluoride catalyst as described in, for example, U.S. Pat. Nos. 3,441,538; 3,442,857 and 3,516,966.

Additionally, the polymers may be prepared by the Friedel-Crafts processes as described in, for example, U.S. Pat. Nos. 3,065,205; 3,419,462; 3,441,538; 3,442,857; 3,516,966 and 3,666,612. In these patents, a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent.

The polyketones may also be prepared according to the process as described in, for example, U.S. Defensive publication No. T 103,703 and U.S. Pat. No. 4,396,755.

In this process, reactants such as (a) an aromatic monocarboxylic acid, (b) a mixture of at least one aromatic dicarboxylic acid, and at least one aromatic compound capable of reacting with said dicarboxylic acid, and (c) combinations of (a) and (b) are reacted in the presence of a fluoroalkane sulphonic acid, particularly trifluoromethane sulphonic acid.

Additionally, poly(aryl ether ketone)s of the following formulae:

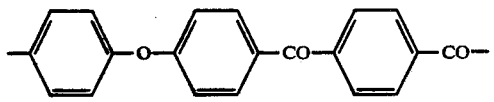

may also be prepared according to the process as described in, for example, U.S. Pat. No. 4,398,020. In such a process, (a) a mixture of substantially equimolar amounts of
(i) at least one aromatic diacyl halide of the formula

where —$Ar_1$— is a divalent aromatic radical, Y is halogen and COY is an aromatically bound acyl halide group, which diacyl halide is polymerizable with at least one aromatic compound of (a)(ii), and (ii) at least one aromatic compound of the formula

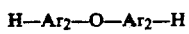

where —$Ar_2$— is a divalent aromatic radical and H is an aromatically bound hydrogen atom, which compound is polymerizable with at least one diacyl halide of (a)(i), and (b) at least one aromatic monoacyl halide of formula

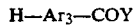

where —$Ar_3$— is a divalent aromatic radical and H is an aromatically bound hydrogen atom, Y is halogen, and COY is an aromatically bound acyl halide group, which monoacyl halide is self-polymerizable, and (c) a combination of (a) and (b) in the presence of a fluoroalkane sulphonic acid.

The term poly(aryl ether ketone) as used herein is meant to include homopolymers, copolymers, terpolymers, block copolymers, graft copolymers, and the like. For example, any one or more of the repeating units (V) to (IX) may be combined to form copolymers, etc.

PAE and PAEK Oligomers

The PAE and PAEK dihydroxy-terminated oligomers are prepared using the methods that were outlined for the preparation of the corresponding high molecular weight poly(aryl ethers).

Typically, the nucleophilic polycondensation of an excess of the dihydric phenol with the activated dihalo- or dinitrobenzenoid compound yields a dihydroxy endcapped oligomer. The molecular weight of the oligomer is inversely proportional to the excess of diphenol employed; i.e., the higher the excess of the dihydric phenol, the lower the molecular weight of the resulting oligomer. A preparation is shown in equation (III), where 1 is one or greater.

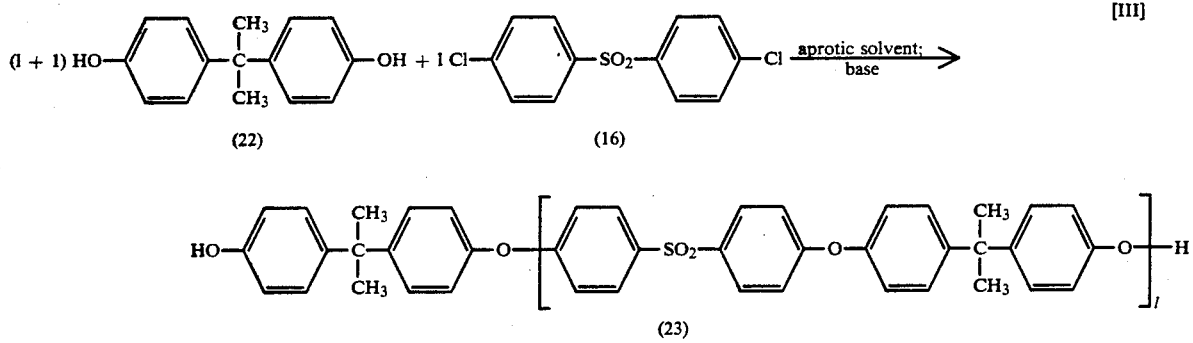

Dihydroxy-terminated oligomers can also be prepared via the electrophilic route. It is most convenient to first prepare the dihalo-terminated material and then hydrolyze it. A typical preparation is shown in equation (IV), where k is one or greater.

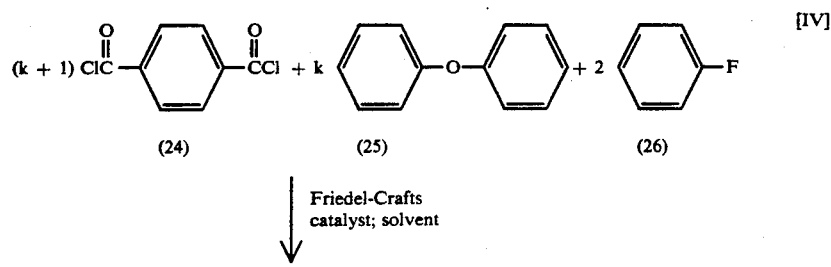

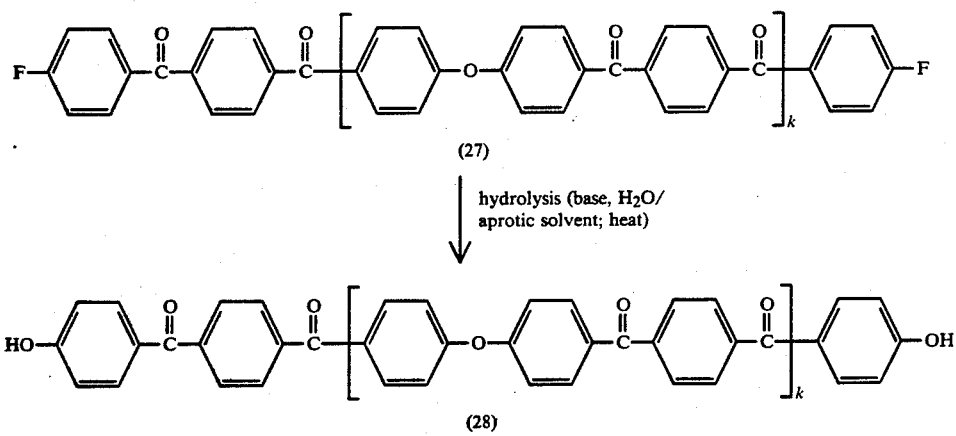

(27)

↓ hydrolysis (base, H₂O/aprotic solvent; heat)

(28)

Most preferably diphenyl ether, 4,4'-diphenoxybenzophenone, biphenyl and/or naphthalene, are reacted with terephthaloyl chloride, isophthaloyl chloride and/or phosgene, followed or accompanied by reaction with an end-capping agent such as (26) or (29).

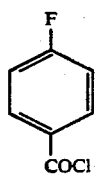

(29)

The above dihalo-and dihydroxy-terminated oligomers are described in detail in the copending U.S. patent application Ser. No. 039,310, by R. A. Clendinning et al., titled "Poly(aryl ether ketone) Block Copolymers", filed on Apr. 16, 1987, U.S. Pat. No. 4,786,694 commonly assigned.

Block Copolymerization

As indicated in equation (II), the molecular weight build-up [step (b)] is performed by reacting the low molecular weight block copolymer (8) with a diaryl carbonate or a diaryl dicarboxylate. Obviously, any diaryl ester of any dicarboxylic acid can be used; The preferred aryl groups are phenyl and tolyl; the preferred diesters are carbonates, terephthalates, and isophthalates. The amount of the diester should be at least equivalent to the concentration of the hydroxyl groups. Amounts in the range of from about 1 equivalent ester to about 1.25 equivalent ester per hydroxyl group are preferred; most preferred are amounts in the range of from about 1 to about 1.10 equivalent of ester per hydroxyl group.

Both steps (a) and (b) are performed in the presence of a catalyst. Both acidic and basic catalysts are useful. Typical acidic catalysts are, for example, protonic acids; typical base catalysts are alkali, alkaline earth metal and tin hydroxides, oxides, phenoxide, alkoxides, carbonates, hydrides, and organic salts, e.g., acetates or benzoates. Lithium and potassium derived bases are preferred. Most preferred are lithium and potassium phenoxides and potassium tert.butoxide. The catalyst may be used in amounts of from about 0.25 to about 10 mole percent based on the number of moles of the dihydroxy poly(aryl ether) oligomer employed; amounts in the range of from about 0.5 to about 3 mole percent are preferred; most preferred is the catalyst range of from about 0.75 to about 1.5 mole percent.

The polymerizations may be performed in the temperature range of from about 100° to about 350° C. It is preferred to run the bulk reactions at temperatures of about 200° to about 340° C.; most preferably for the bulk reactions are temperatures of from about 250° to about 325° C. As indicated in equation (II) one may optionally use a solvent. In this case it is preferred to use the solvent for step (a) only, and t charge all of the reagents, including the the diaryl ester, at the start of the reaction. Step (a) is then preferably performed at about 200° to about 260° C. The obtained prepolymer is isolated either via coagulation in a non-solvent, or via solvent evaporation. The product is then advanced to high molecular weight by heating under vacuum, at about 200° to about 340° C., preferably at about 250° to about 325° C. It is advantageous to perform step (b); equation (II), under reduced pressure, so as to facilitate the removal of phenol by-product which is necessary for the attainment of high molecular weight. The pressure in step (b), equation (II), should preferably be below about 15 mm Hg, and most preferably below about 10 mm Hg.

In another embodiment, the reactions which utilize a solvent may also be performed in a continuous manner, e.g. in an extruder. In this scheme, the reactants (for example the dihydroxy-terminated poly (aryl ether) oligomer, the polycarbonate, the diaryl ester, and the catalyst) are charged as a solution in a suitable solvent into a multivented extruder which is maintained at a temperature range of from about 100° to about 350° C., preferably from about 200° to about 340° C. Step (a) takes place in the initial zones of the extruder with elimination of the major part of the solvent. Step (b) occurs in the latter stages of the extrusion during which the remainder of the solvent and phenol by-product are eliminated. The operation is performed under vacuum within the range indicated above.

In principle, any inert solvent is useful for the purposes of the instant invention. Preferred solvents having boiling points of at least about 100° C. under atmospheric pressure. Most preferably the boiling point of the solvent (atmospheric pressure) should be at least 180° C. Note, however, that even lower boiling solvents, e.g., benzene, for example, may be useful. Indeed, if the solvent is to be used in step (a) only (vide supra), higher than atmospheric pressure can be employed to reach the required reaction temperature. Typical useful solvents include the chlorinated aromatics (e.g. chlorobenzene, o-dichlorobenzene, p-dichlorobenzene, 1,2,4trichlorobenze, etc. . . ) aromatic ethers (e.g. anisole, diphenyl ether, etc. . . ), amides (e.g. N,N-dimethyl formamide, N,N-dimethylacetamide, N-methylpyrrolidone, N-cyclohexylpyrrolidone, etc. . . ), sulfones (e.g. diphenyl sulfone, phenyl tolyl sulfone, dimethyl sulfone, etc. . . ), sulfoxides (e.g. dimethyl sulfoxide, etc. . . ), aromatic ketones (e.g. benzophenones), aromatic nitro compounds (e.g. nitrobenzene), and the like. The concentrations of reactants are generally in the range of from about 20 to about 70 percent solids; concentrations of from about 40 to about 60 percent solids are preferred.

It is preferred to perform the instant copolymerizations in bulk, under vacuum, using good mixing equipment such as single or twin screw extruders. Starve-feeding of reactants (i.e. operating at a capacity of less than the full screw capacity) is desirable, since it maximizes surface exposure to vacuum and, thus, facilitates the stripping of phenol. Under these conditions, at the temperatures indicated above, reaction times of about 2 to 10 minutes are sufficient to obtain high polymer of excellent quality. On the other hand, the use of laboratory glassware equipment; and/or of solvents results in slower reaction times, sometimes as long as several hours.

The block copolymers of the present invention exhibit a reduced viscosity of from about 0.30 to about 5.0, and preferably from about 0.35 to about 2.0 dl/g as measured in an appropriate solvent (e.g. chloroform), at a concentration of 0.2 g/100 ml, at 25° C.

The block copolymers of this invention may include mineral fillers such as carbonates including chalk, calcite and dolomite; silicates including mica, talc, wollastonite; silicon dioxide; glass spheres; glass powders; aluminum; clay, quartz; and the like. Also, reinforcing fibers such as fiberglass, carbon fibers, and the like may be used. The polymers may also include additives such as titanium dioxide, thermal stabilizers; ultraviolet light stabilizers, plasticizers, and the like.

The materials of this invention may be fabricated into any desired shape, i.e. moldings, coatings, films or fibers. They are also useful in blends with a variety of other polymers.

EXAMPLES

The following examples serve to give specific illustrations of the practice of this invention but they are not intended in any way to limit the scope of this invention.

The following designations used in the examples have the following meaning:

Polycarbonate: Bisphenol A polycarbonate having the repeat unit of the following formula

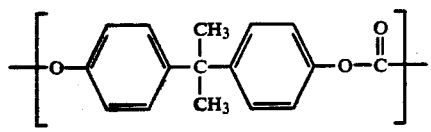

and having a number average molecular weight of about 20,000 as determined by gel permeation chromatography (described later). Lexan 101 polycarbonate available from General Electric was utilized in all but comparative example 2 in which Lexan 104 was used. The two resins are virtually the same in all  spects except that the 101 grade has a reduced viscosity of 0.6 as opposed to 0.52 for the 104 material. The number average molecular weights are essentially identical, however. The reduced viscosities throughout the examples which follow were measured in chloroform (0.2 g/100 ml.), and the values are reported in dl/g.

Polysulfone I: Bisphenol A based polysulfone having the molecular repeat formula

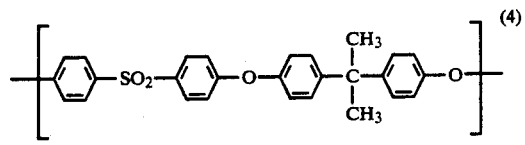

and a number average molecular weight of about 17,000. This resin was used as available commercially from Amoco Performance Products, Inc. under the tradename of Udel P-1700. The reduced viscosity of the polymer was about 0.48 dl/g measured in chloroform (0.2 g/100 ml.,) at 25° C.

Polysulfone II: A dihydroxy terminated bisphenol A polysulfone oligomer having a number average molecular weight of about 7,500 and a repeat unit of the same formula as shown for polysulfone I. The hydroxyl groups at either end of the oligomeric chain are part of the bisphenol A units which end cap the polymer. The reduced viscosity of this oligomer was 0.18 dl/g measured under the conditions outlined above for polysulfone I.

Polyarylate: A polyaryl ester available from Amoco Performance Products, Inc. under the tradename Ardel D-100. It has the following repeat structure

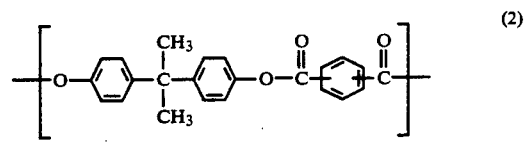

Experimental specimens obtained from the examples below were tested by a variety of techniques. All mechanical property tests were performed on specimens taken from 4×4×0.02 in. compression molded plaques. The test specimens used, as cut from the plaques had the nominal dimensions: 4 in. length by ⅜ in. width by 0.02 in. thickness. The tensile modulus was measured using the 1% secant method according to a procedure similar to ASTM D-638. Tensile strength nd elongation at break were measured according to STM D-638. Pendulum impact strength was measured as follows:

A steel pendulum is used, cyclindrical in shape with a diameter of 0.83 inches and weighing 1.562 pounds; the striking piece, mounted almost at the top of the pendulum is a cylinder 0.3 inches in diameter; film specimens, 4 inches long 0.125 inches wide and about 1 to 30 mils thick are clamped between the jaws of the tester so that the jaws are spaced 1 inch apart; the 0.125 inch width of the film is mounted vertically; the pendulum is raised to a constant height to deliver 1.13 foot pounds at the specimen; when the pendulum is released the cylindrical striking piece hits the specimen with its flat end, breaks the film, and travels to a measured height beyond; the difference in the recovery height (i.e., the difference in the potential energy of the pendulum at the maximum point of the upswing) represent the energy absorbed by the specimen during the rupture; the impact strength, expressed in foot pounds per cubic inch, is obtained by dividing the pendulum energy loss by the volume of the specimen.

Glass transition temperatures (Tg) were determined by one or more of the following techniques: differential scanning calorimetry on samples weighing 10–20 mg. in aluminum pans and using a heating rate of 10 deg.C./min. The unit used for this test was a DSC-2 Perkin Elmer apparatus. Tg's were also determined via stiffness-temperature curves by the resilience method as described by O. Olabisi et al. (Polymer-Polymer Miscibility, Academic Press, New York (1979) pp. 126–127). A third technique used as dynamic mechanical thermal analysis (DMTA) which was performed on ⅛ in. wide×0.02 in. thick pieces cut from the compression molded plaques described earlier. The glass transition temperature for the purpose of this test was defined as the maximum in the loss tangent curve. The instrument used for this test was a Polymer Laboratories Dynamic Mechanical Thermal Analyzer employing tensile strain at a rate of 1 Hz. Of the three techniques used for determining the Tg, the latter is generally recognized as being the most sensitive one.

Molecular weight (number and weight average) data were obtained from gel permeation chromatography experiments using tetahydrofuran as the carrier solvent and based on a polystyrene calibration. The solution concentration employed throughout was 0.5 g/100 mL; the flow rate was 1.0 mL/min; and the injection size was 200 microliters. Melt flows for the various resins were determined on an Extrusion Plastometer melt flow apparatus at a temperature of 300° C. and 44 psi applied pressure, using a procedure similar to that of ASTM D-1238. Other techniques pertaining to specific experiments are described in the appropriate examples.

The reduced viscosities of all the block copolymers were measured in chloroform (0.2 g/100 ml.) at 25° C. and are expressed in dl/g.

EXAMPLE 1

A 500 mL four-neck round bottom flask was equipped with a stainless steel stirrer, a nitrogen inlet, a condenser and a stopper. The flask was charged with polysulfone II (50 g), polycarbonate (50 g), diphenylcarbonate (1.38 g) and diphenyl ether (100 mL). The mixture was heated to 250° C. in an oil bath while maintaining a nitrogen flow. Potassium tert-butoxide (0.029 g) was added. The reaction was kept at 250° C. for 5 hours. The resulting clear viscous solution was diluted with chlorobenzene (250 mL). The cooled polymer solution was coagulated into isopropanol in a high-speed blender. The precipitated polymer was filtered and washed with isopropanol and dried at 110° C., under 50 mm pressure. The reduced viscosity of this product was 0.36 dl/g.

About 2.0 g of the above prepolymer were placed in a test tube with a side arm. The tube was stoppered and was kept at 250° C. for 1 hour while maintaining a vacuum of less than 1 mm Hg. The polymer was recovered by breaking the test tube. A solution cast film was transparent and tough, and had a reduced viscosity of 0.60 dl/g. In another run, the above melt advancement was repeated using 50 g of prepolymer. The resulting product had the properties shown in Table 1.

Diphenyl ether was replaced by diphenyl sulfone in another run. The melt advancement resulted again in a tough polymer. The resulting reduced viscosity was 0.62 plaque from the same material (molded at about 265° C.) and that of the melt flow extrudate after 30 min at 265° C. were 0.66 and 0.61 dl/g respectively, reflecting the melt stability of the block copolymer.

COMPARATIVE EXAMPLE 1

As a control experiment, the block copolymerization was carried out in diphenyl ether as described above, but without diphenylcarbonate. The prepolymer obtained from this experiment had a reduced viscosity of 0.36 dl/g. Melt advancement of this prepolymer under vacuum as described above had little effect as evidenced by a negligible change in the reduced viscosity of the resulting mass to 0.39 dl/g.

EXAMPLE 2

A mixture of polysulfone II (1 g), polycarbonate (1 g), diphenylcarbonate (0.028 g) and potassium tert-butoxide (5 mg) was placed in a test tube with a side arm. The tube was stoppered and heated in a sand bath at 280° C. After 4 hours at 280° C., the side arm was connected to a vacuum source (<1 mm Hg). The test tube was heated at 280° C. for another hour while under vacuum. The tube was cooled and broken. The residue was dissolved in chlorobenzene. The glass pieces were filtered off using a sintered glass funnel. The clear polymer solution was coagulated and the polymer washed with isopropanol. The precipitated polymer was dried overnight at 110° C. and at 50 mm Hg pressure. The reduced viscosity of this polymer was 0.56. In another run, 20 g of polysulfone II were treated with 20 g of polycarbonate under the conditions described above to to yield a tough polymer with a reduced viscosity of 0.47 dl/g.

EXAMPLE 3

A 250 mL three-neck round bottom flask equipped with a mechanical stirrer, condenser and a nitrogen inlet was charged with 20 g of polysulfone II, 20 g of polyarylate, 0.82 g of diphenylterephthalate and 40 mL diphenyl ether. The flask was heated in an oil bath to 125° C., until everything dissolved. After 0.5 hours at 125° C., potassium tert-butoxide (0.029 g) was added. The temperature was raised to 250° C. and the reaction mixture was kept at 250° C. for 4 hours. The resulting clear viscous liquid wad cooled to about 80° C. Chlorobenzene (200 mL) was added to dilute the solution. The polymer, recovered by coagulation into methanol, had a reduced viscosity of 0.35 dl/g. The above prepolymer (3 g) was placed into a test tube with a side arm. The test tube was stoppered and was heated at 250° C. for 1 hour. The side arm was connected to a vacuum pump and the vacuum was applied very slowly. After 3 hours at 250° C. and at <1 mm pressure, the reaction product was recovered by breaking the glass. The reduced viscosity attained here was 0.50 dl/g. A solution cast film was transparent and tough. A similar melt advancement for 19 hours using a 18 g of the prepolymer also resulting in a tough polymer with a reduced viscosity of 0.51 dl/g. The mechanical properties obtained for the above polymer are shown in Table 1.

EXAMPLE 4

A 500 mL four-neck round bottom flask was fitted with a mechanical stirrer through a stuffing box, a nitrogen inlet, a stopper, a thermocouple and a vacuum jacketed condenser. On top of the vacuum jacketed condenser were attached a water separator and a condenser. 4,4'-Biphenol (37.24 g, 0.2 mole), dichlorodiphenylsulfone (52.84 g, 0.184 mole), ground potassium carbonate (30.40 g, 0.220 mole), sulfolane (185 g) and chlorobenzene (80 g) were placed into the flask. Prepurified nitrogen was bubbled into the above mixture for 0.5 hours at room temperature. The nitrogen stream was maintained throughout the reaction. Using a heating mantle, the flask was quickly heated to 220° C. The stopper was replaced by a pressure equalizing addition funnel containing chlorobenzene (300 mL). Fresh chlorobenzene was added drop by drop to maintain the temperature at 220° C. After 1 hour at 220° C., dry chlorobenzene (150 mL) was added followed by glacial acetic acid (2 mL). The temperature of the solution was maintained above 120° C. The salts were filtered through a hot sintered funnel. The clear hot filterate was coagulated into methanol. The precipitated oligomer was filtered and dried at 110° C. and at 50 mm Hg pressure. A mixture of the above oligomer (10 g), polycarbonate (10 g), diphenylcarbonate (0.428 g) in diphenyl ether (60 g) was degassed by bubbling nitrogen for 0.5 hours. Potassium phenoxide (10 mg) was added and the reaction mixture was heated at 250° C. for 5 hours. The prepolymer was recovered by coagulation into methanol. The dried prepolymer was heated at 250° C. and at 1 mm Hg pressure for 4 hours. The resulting mass was recovered by breaking the glass. The mechanical properties obtained are shown in Table 1.

TABLE I

| Mechanical properties for Polymers Made in Examples 1, 3 and 4 | | | |
| --- | --- | --- | --- |
| Property | Ex. 1 | Ex. 3 | Ex. 4 |
| Reduced Viscosity (dl/g) | 0.57 | 0.50 | — |
| Tg (°C.) | 165 | 190 | 185 |
| Tensile Modulus (psi) | 226,000 | 226,000 | 217,000 |
| Tensile Strength (psi) | 9,180 | 9,390 | 7,790 |
| Elongation at Break (%) | 6 | 6 | 6 |
| Pendulum Impact (ft-lb/in3) | 69 | 73 | 17–95 |

COMPARATIVE EXAMPLE 2

This example shows that a catalyst is required to promote the reaction between a dihydroxy-terminated polysulfone and polycarbonate. A 50/50 by weight mixture of polysulfone II and polycarbonate was extruded at 510° F. in a 1 in. diameter single screw Killion extruder having an L/D ratio of 36/1. The extruder consisted of seven zones (including the die) and two vents located in zones 3 and 5 of the extruder barrel. The vents were both connected to vacuum (5–10 mm Hg) generated by a mechanical vacuum pump during the operation of the extruder. Zone 1 as kept cold during all experiments by running cooling water through the throat of the extruder. Zone 2 was kept at 500° F., whereas the temperature of zones 3-7 was varied for different experiments as indicated in the text. The extrudate was Pelletized, dried, and molded into a 0.020 in. thick plaque. The plaque had a white translucent "milky" appearance and had two glass transition temperatures indicating the immiscibility of the two polymers. Other properties of the blend are shown in Table 2. The data listed in Table 2 illustrate that the material had poor mechanical properties, which is likely the result of the presence of the unreacted low molecular weight oligomer in the system.

COMPARATIVE EXAMPLE 3

A 50/50 dry blend of polycarbonate and polysulfone I was extruded at 510° F. to give an opaque extrudate of white color. The 0.02 inch-thick molded plaque specimen from this extrudate looked very similar to that obtained from comparative example 2 (i.e. translucent). This material also exhibited two glass transition temperatures by the resilience test as well as by DSC and DMTA. Properties of this blend are shown in Table 2.

EXAMPLE 5

A mixture of polycarbonate, polysulfone II, diphenyl carbonate and potassium phenoxide was prepared in the following manner:

The required amount of potassium phenoxide was first dissolved in 50 ml of tetrahydrofuran (THF). The potassium phenoxide solution was then spread over a bed of polycarbonate pellets, allowing the THF to evaporate. Diphenyl carbonate in powder form was dry-blended with the polysulfone II, which was in fine powder (fluff) form. The polycarbonate/potassium phenoxide and polysulfone II/diphenyl carbonate mixtures were then well dried in a vacuum oven overnight at a temperature of about 200° F. before combining all four components into a single homogenized mixture. The composition of the dry mixture was as follows:

| Material | Parts (wt) | Percent (approx) |
| --- | --- | --- |
| Polycarbonate | 50 | 49.306 |
| Polysulfone II | 50 | 49.306 |
| Diphenyl Carbonate | 1.39 | 1.371 |
| Potassium Phenoxide | 0.0171 | 0.017 |
| Total | 101.4071 | 100.00 |

The mixture w extruded at 510° F. under vacuum (5–10 mm 5 Hg) and the extrudate was pelletized. The extrudate was amber colored and transparent and exhibited a single glass transition temperature of 165° C. The reduced viscosity of material was 0.4 dl/g. The residence time was estimated to be approximately 5 minutes and the screw speed was 120 RPM. Properties of this product are listed in Table 2.

EXAMPLE 6

Using the same composition and same conditions as for example 5 except for an extrusion temperature of 555° F., the resulting polymer, also a transparent single glass transition material, had an RV of 0.47 dl/g with other properties as shown in Table 2.

EXAMPLE 7

The same composition as for examples 5 and 6 was extruded also under the same conditions except for a processing temperature of 600° F. and yielded an extrudate which was again transparent, amber in color and single phase as evidenced by a single glass transition temperature. This product had a reduced viscosity of 0.55 dl/g, and is listed along with the other materials in Table 2.

TABLE 2

Properties of Extruder-Reacted Polysulfone/Polycarbonate Block Copolymers Compared with Those of Physical Blends of Polysulfone and Polycarbonate

| | Example | | | | |
| --- | --- | --- | --- | --- | --- |
| | comparative | | | | |
| | 2 | 3 | 5 | 6 | 7 |
| Processing Temperature (°F.) | 510 | 510 | 510 | 555 | 600 |
| RV (dl/g) | 0.50 | 0.52 | 0.40 | 0.47 | 0.55 |
| MF (g/10 min) | 42.7 | 5.2 | 26.7 | 11.4 | 4.1 |
| No. Average | 13,600 | 16,900 | 12,600 | 15,700 | 18,600 |

TABLE 2-continued

Properties of Extruder-Reacted Polysulfone/Polycarbonate Block Copolymers Compared with Those of Physical Blends of Polysulfone and Polycarbonate

| | Example | | | | |
|---|---|---|---|---|---|
| | comparative | | | | |
| | 2 | 3 | 5 | 6 | 7 |
| Mol. Wt. | | | | | |
| Wt. Average Mol. Wt. | 38,700 | 54,600 | 40,800 | 45,000 | 58,800 |
| Mw/Mn | 2.83 | 3.23 | 3.23 | 2.86 | 3.17 |
| Tensile Strength (psi) | 8,270 | 8,930 | 9,600 | 9,650 | 9,740 |
| Yield Strength (psi) | * | 8,930 | 9,600 | 9,650 | 9,740 |
| Tensile Modulus (psi) | 249,000 | 239,000 | 249,000 | 233,000 | 238,000 |
| Yield Elongation (%) | * | 5.6 | 5.2 | 6.2 | 5.8 |
| Pendulum Impact (ft-lb/in$^3$) | 78 | 315 | 81 | 91 | 99 |
| Number of Tg's Observed | 2 | 2 | 1 | 1 | 1 |
| Tg (°C.) | 162,187 | 157,190 | 165 | 165 | 165 |

* No yield (brittle failure)

COMPARATIVE EXAMPLES 4-7

Four melt blends composed of 50/50 by weight polysulfone II/polycarbonate, diphenyl carbonate and potassium phenoxide were prepared in a Brabender Plasticorder mixer at different temperatures and potassium phenoxide concentrations. The temperature/potassium phenoxide combinations are listed in Table 3. Each of the four mixtures were compounded for 5 minutes at 50 RPM while the Brabender was blanketed by nitrogen to minimize exposure to ambient air. No vacuum was applied to the system for any of these runs. The resins obtained from these experiments were all clear indicating a one phase system but were all very brittle. The samples obtained all had reduced viscosities in the range 0.30-0.32 dl/g, and were too brittle to test for mechanical properties. These examples illustrate the requirement of vacuum stripping as a necessary condition for advancing the molecular weight of the block copolymer by removing the phenolic by-product from the reaction medium.

TABLE 3

Polysulfone II/Polycarbonate/diphenyl carbonate/Potassium Phenoxide Mixes Compounded in Brabender Plasticorder Mixer

| Comparative Example | mole % Potassium Phenoxide | Temperature (C.) | Reduced Viscosity |
|---|---|---|---|
| 4 | 0.5 | 265 | 0.32 |
| 5 | 0.5 | 285 | 0.32 |
| 6 | 1 | 265 | 0.30 |
| 7 | 1 | 285 | 0.31 |

EXAMPLES 8-11

50/50 by weight mixtures of polysulfone II/polycarbonate with 1 mole % potassium phenoxide were extruded at 555° F. using different levels of diphenyl carbonate. Other extrusion conditions were similar to examples 5-7. Table 4 summarizes the data from these examples which was restricted to melt flows and molecular weights. The extrudates obtained here were all clear amber and the color tended to get lighter for the samples made with 15 and 30% excess diphenyl carbonate (examples 10 and 11). Also, these two batches were somewhat difficult to pelletize as they were more brittle due to the lower molecular weights. This series of examples demonstrate the sensitivity of the resultant block copolymer molecular weight with respect to diphenyl carbonate concentration. The desirability of using diphenyl carbonate equivalent ratios close to 1/1 with respect to the number of moles of dihydroxyl terminated material present is thus illustrated.

TABLE 4

Examples 8-11 Melt Flow and Molecular Weight

| Example | Percent (%) Excess Di-Phenyl Carbonate | Melt Flow (g/10 min) | No. Average Mol. Weight | Wt. Average Mol. Weight |
|---|---|---|---|---|
| 8 | 0 | 13.8 | 14,600 | 48,900 |
| 9 | 5 | 15.6 | 13,900 | 44,000 |
| 10 | 15 | 43.2 | 12,000 | 36,300 |
| 11 | 30 | 31.6 | 12,200 | 37,000 |

What is claimed is:

1. Block copolymers selected from the formulae
   (a) $(AB)_m$, (b) ABA, (c) BAB, (d) and combinations thereof;
   wherein A is a poly(aryl ether) block comprising repeating units of the formula;

$$-O-E-O-E'-$$

wherein O is oxygen, E is the residuum of a dihydric phenol and E' is the residuum of a benzenoid compound having an inert electron withdrawing group in at least one of the positions ortho and para to the valence bonds; both of said residue being valently bonded to the ether oxygens through aromatic carbon atoms; B is a poly(arylate-carbonate) block; the molecular weights of the blocks A and B being at least 500; and m being an integer and is one or greater.

2. A process for the preparation of block copolymers selected from the following formulae
   (a) $(AB)_m$, (b) ABA, (c) BAB,
   (d) and combinations thereof
   wherein A is a poly(aryl ether), or a poly(aryl ether ketone) block, B is a poly(arylate-carbonate) block; the molecular weights of the blocks A and B individually being at least 500; m is an integer and is one or greater; which comprises the steps of
   (a) the reaction of a dihydroxy-terminated poly(aryl ether) or poly(aryl ether ketone) oligomer with a high molecular weight aromatic polycarbonate, or a high molecular weight polyarylate, poly(arylate-carbonate) to yield a block copolymer; followed by
   (b) the coupling of the material obtained in step (a) to the required molecular weight, using a diaryl ester of carbonic or of a dicarboxylic acid;
   wherein the poly(arylate-carbonate) comprises at least two of the following four recurring-units in its linear chain

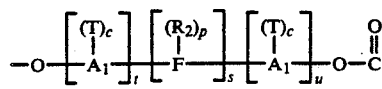

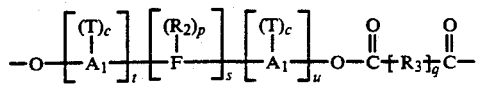

-continued

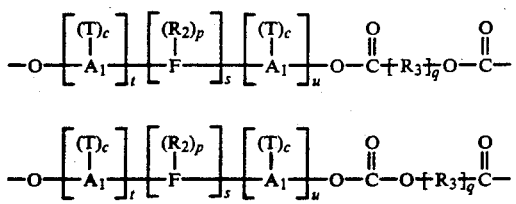

wherein $A_1$ and $R_3$ are divalent aromatic radical which may be the same or different; F is selected from the group of alkylene, cycloalkylene, alkylidene and cycloalkylidene; $R_2$ is hydrogen, alkyl, cycloalkyl or aryl; T is halogen, nitro, $R_2$ or $OR_2$; c is any whole number from and including zero through the number of positions available on A for substitution; p is any whole number from and including zero through the number of positions available on F for substitution; q is a whole number equal to at least one; s is zero or one; t is a whole number equal to at least one; and u is any whole number including zero.

3. A process as defined in claim 2 wherein the poly(arylate-carbonate) is the reaction product of phosgene, terephthaloyl chloride, isophthaloyl chloride, and 2,2-bis(4-hydroxyphenyl)propane.

4. A process for the preparation of block copolymers selected from the following formulae
(a) (AB)m, (b) ABA, (c) BAB,
(d) and combinations thereof wherein A is a poly(aryl ether ketone) block, B is an aromatic polycarbonate, or a polyarylate, or a poly(arylate-carbonate) block; the molecular weights of the blocks A and B individually being at least 500; m is an integer and is one or greater; which comprises the steps of
(a) the reaction of a dihydroxy-terminated poly(aryl ether ketone) oligomer with a high molecular weight aromatic polycarbonate, or a high molecular weight polyarylate, or a high molecular weight poly(arylate-carbonate) to yield a block copolymer; followed by
(b) the coupling of the material obtained in step (a) to the required molecular weight, using a diaryl ester of carbonic or of a dicarboxylic acid;
wherein the poly(aryl ether ketone) blocks contain repeating units of one or more of the following formulae

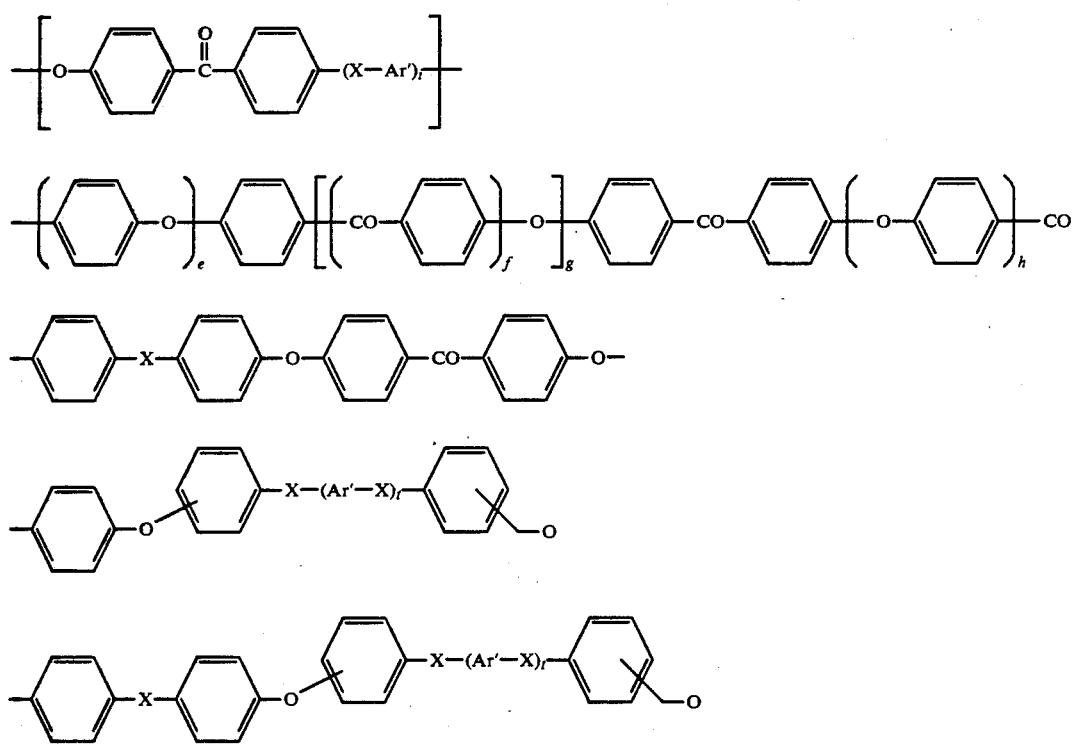

wherein $Ar^1$ is independently a divalent aromatic radical selected from phenylene, biphenylene or naphthylene, x is independently $$O,\ \overset{O}{\underset{\|}{C}},$$

or a direct bond and i is an integer of from 0 to 3; f, g, h and t are 0 or 1 and e is an integer of 1 to 4.

5. A process as defined in claim 4 wherein the poly(aryl ether ketone) blocks have one or more repeating units of the formulae

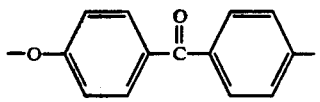

-continued
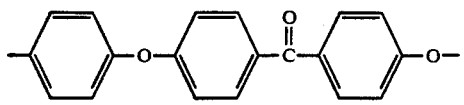
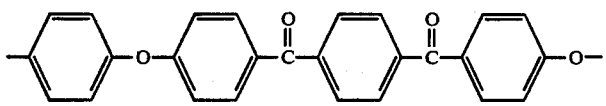
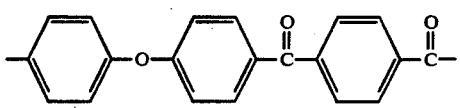
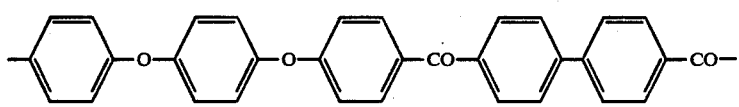
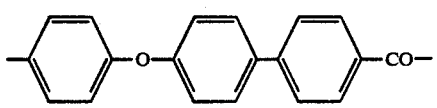
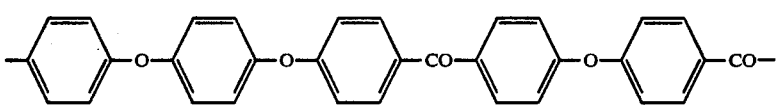
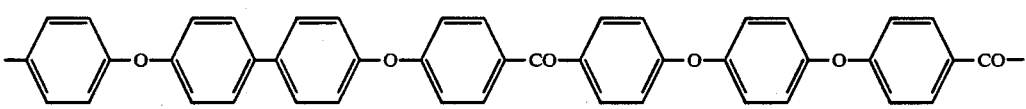
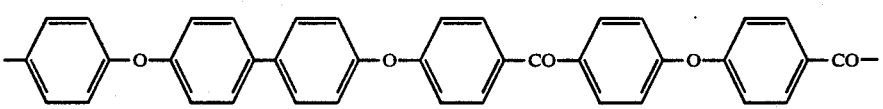
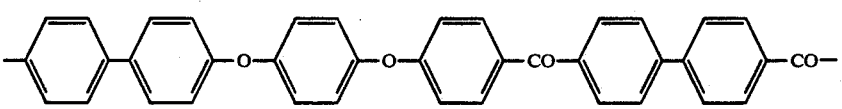
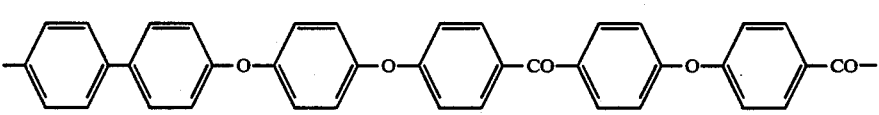
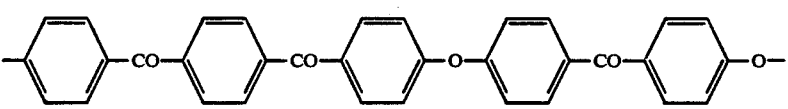
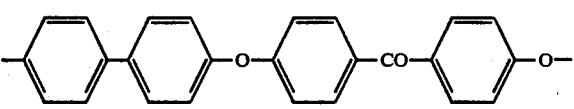
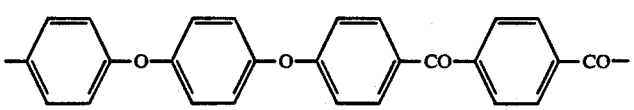
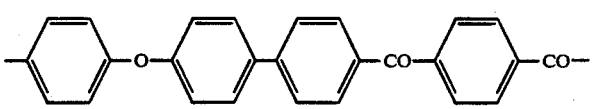

-continued

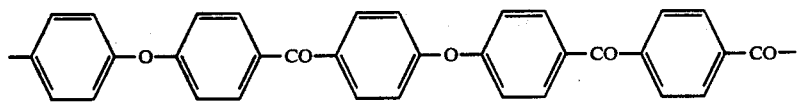

6. A process or the preparation of block copolymers selected from the following formulae
   (a) (AB)m, (b) ABA, (c) BAB,
   (d) and combinations thereof
wherein A is a poly(aryl ether), block, B is an aromatic polycarbonate, or a polyarylate, or a poly(arylate-carbonate) block; the molecular weights of the blocks A and B individually being at least 500; m is an integer and is one or greater; which comprises the steps of
   (a) the reaction of a dihydroxy-terminated poly(aryl ether) oligomer with a high molecular weight aromatic polycarbonate, or a high molecular weight polyarylate, or a high molecular weight poly(arylate-carbonate) to yield a block copolymer; followed by
   (b) the coupling of the material obtained in step (a) to the required molecular weight, using a diaryl ester of carbonic or of a dicarboxylic acid;
wherein the poly(aryl ether) block is of the formula

wherein E is a residuum of a dihydric phenol, and E' is the residuum of one or more of the following:

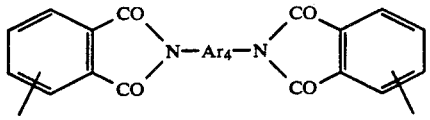

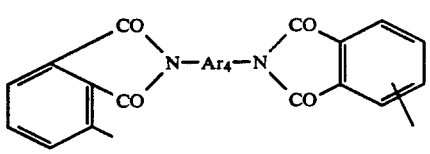

or isomers thereof

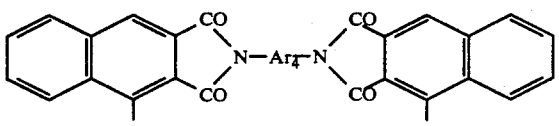

or isomers thereof

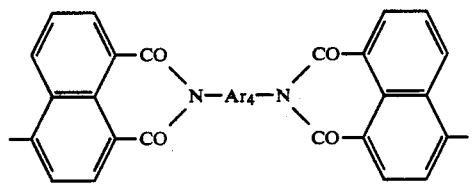

or isomers thereof wherein $Ar_4$ is a divalent aromatic radial.

* * * * *